UNITED STATES PATENT OFFICE.

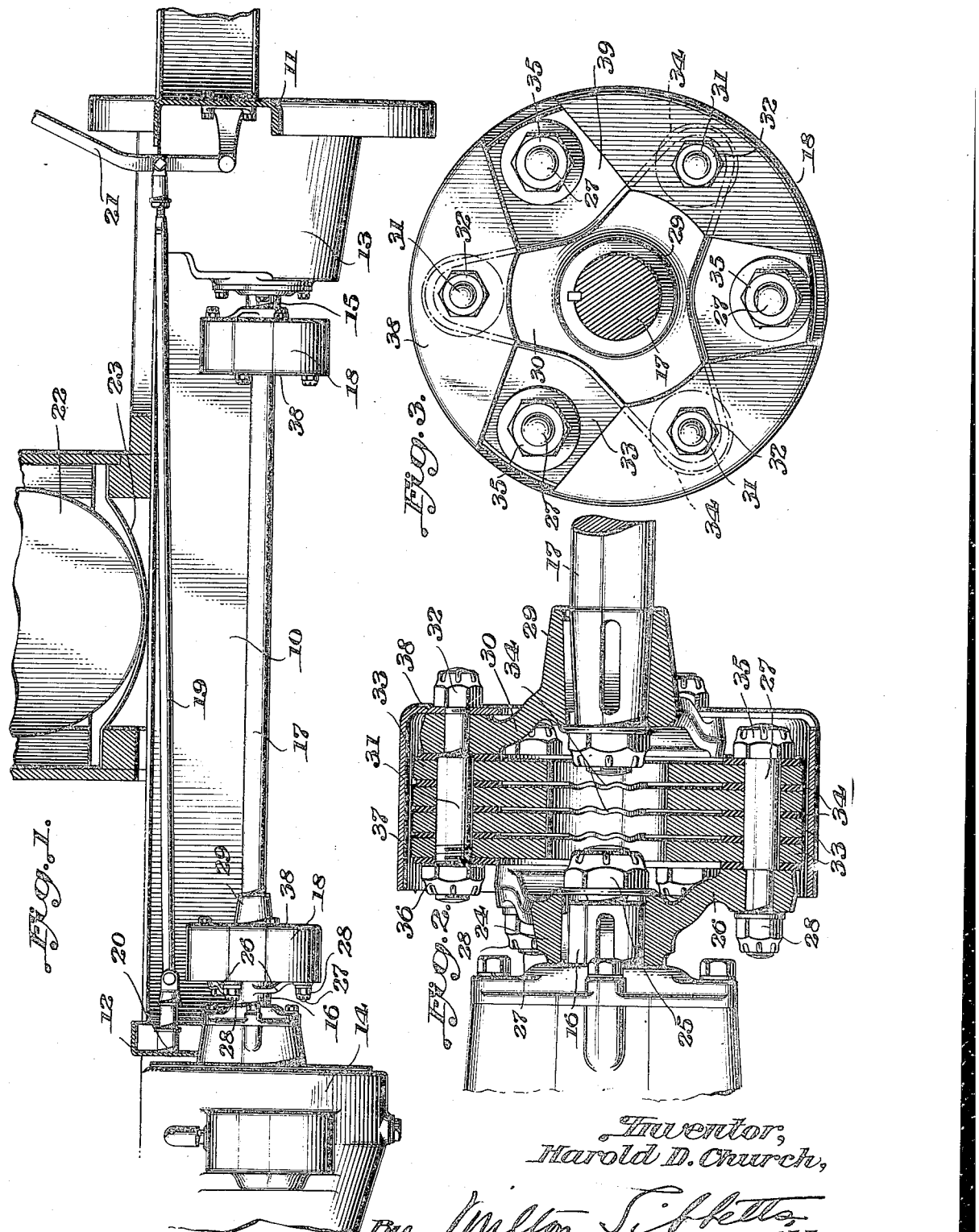

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

SHAFT COUPLING.

1,422,339.            Specification of Letters Patent.       Patented July 11, 1922.

Application filed January 2, 1919. Serial No. 269,303.

*To all whom it may concern:*

Be it known that I, HAROLD D. CHURCH, a citizen of the United States, and resident of Detroit, Wayne County, State of Michigan, have invented certain new and useful Improvements in Shaft Couplings, of which the following is a specification.

This invention relates to motor vehicles and particularly to shaft couplings and shafts therefor. Shaft couplings in which flexible disks or coupling parts are secured to the adjacent shaft ends have been used in motor vehicle construction, partly because they require no lubrication. They are quite successfully used where there is but slight angularity to the shafts. It has been found, however, that in such use of couplings of this type, if the coupling fails by reason of the coupling disks wearing out or having more power transmitted to them than they can withstand, considerable damage may be done by reason of one of the shafts being thrown wild before the motor can be stopped. This is particularly true where an intermediate shaft is used, which shaft is supported only by the couplings connecting it to the driving and driven shaft.

One of the objects of the present invention is to provide a novel form of coupling in which the coupling itself is considerably strengthened and reinforced, and in which provision is made for retaining the shafts in substantial alignment even though the coupling part should fail.

Other objects and features of the invention will appear from the following description taken in connection with the drawings which form a part of this specification and in which:

Fig. 1 is a side elevation of a portion of a motor vehicle embodying this invention;

Fig. 2 is an enlarged longitudinal sectional view of a coupling such as may be used in the construction shown in Fig. 1; and Fig. 3 is an end view of the coupling shown in Fig. 2.

Referring to the drawings, 10 is a side frame member and 11 and 12 are cross members of a motor vehicle frame, particularly a truck frame. The clutch casing of the motor is shown at 13 and the gear casing is at 14. The driving shaft from the clutch projects from the casing at 15 and the driven shaft as it enters the gear box is shown at 16. Between these two shafts is an intermediate shaft 17 which is adapted to transmit the power of the motor from the clutch shaft 15 to the driven shaft 16. The sole support for the intermediate shaft 17 is through a pair of couplings or universal joints 18, one of which is shown on an enlarged scale in Figs. 2 and 3 and which will be hereinafter more specifically described.

Just above the intermediate shaft 17 is a small rod 19 which extends into the gear box as shown at 20 and which is operated by a hand lever 21. Above the rod 19 is the gasoline tank 22 of the motor vehicle, this tank being supported by a strap 23 or otherwise on the frame of the vehicle.

From the above description it will be seen that should either of the couplings 18 fail, one end of the intermediate shaft 17 would immediately drop out of alignment by reason of centrifugal force and if there should be a continued rotation of it the loose end would be thrown around wildly and do considerable damage to other parts of the vehicle such as the rod 19 or the tank 22. Moreover, the intermediate shaft itself would probably be damaged considerably and at all events repairs on the road would be difficult.

With the present form of coupling the intermediate shaft is prevented from being abnormally thrown out of alignment even on failure of the coupling parts between said shaft and the driving and driven shafts respectively.

For purposes of illustration only the rear coupling 18 is specifically described but it will be understood that the forward coupling is substantially similar. It will be understood also that both shafts 15 and 16 are mounted in suitable bearings or rotatable supports in their respective casings. As shown in Fig. 2, the shaft 16 has a member 24 keyed to it and secured thereon as by a nut 25. This member 24 has a plurality of radial arms 26. There are three of such arms in the form shown. Each arm has a bolt 27 which is secured to it as by a nut 28. These bolts extend lengthwise of the shafts and form the drive transmitting parts of the arms.

The shaft 17 has a member 29 similar to the member 24 of shaft 16. There are also three similar arms 30 and similar bolts 31 with nuts 32 to secure them to the arms 30. The ends of the shafts 16 and 17 are arranged adjacent to each other and the bolts 27 and 31 are arranged alternately as shown particularly in Fig. 3. Connecting these bolts and transmitting the drive from one set to the other are a series of flexible coupling parts or disks 33. These disks may be made of any suitable material such as leather or fabric. These disks are provided with suitable openings so that they may be threaded on to the bolts 27 and 31 and arranged between each pair of disks is a fluted or corrugated washer 34, as shown particularly in Fig. 2. The disks are firmly secured to the arms of both shafts by tightening the nuts 32 or by tightening nuts 35 and 36 on the free ends of the bolts 27 and 31 respectively. By thus clamping the disks 33 to the arms of the respective shafts, and with the washers 34 between the disks, a very strong and sturdy attachment is secured.

With the construction thus far described it will be readily seen that should there be a failure of the disks 33, the end of the shaft 17 would entirely disconnect itself from the shaft 16 and probably cause considerable damage in its further rotation. This lateral operation of the ends of the shafts is, in the present invention, prevented by a shield or guard 37 which has a cylindrical part extending around the disks and arms and a flange part 38 by which it is attached to the arms on one of the shafts. As shown it is attached to the arms 30 on the shafts 17, being secured to said arms by the bolts 31 and nuts 32. It will be seen, also, upon reference to Fig. 3 that the shield is cut away as at 39 opposite the ends of the bolts 27 to permit access to the nuts 35 on said bolts.

It will be understood that with the shield construction a failure of the disks 33 will not result disastrously as the shield will still retain the coupling parts in substantially their normal relative positions and it has even been found that the coupling may be used to transmit power from the shaft 17 to the shaft 16 even though the disks 33 have broken. Thus, with the disks 33 broken or torn the bolts 31 will be thrown against the bolts 27 and as long as they are retained in their position within the shield 37 the drive will be transmitted from one shaft to the other.

Various modifications may be made in the structure shown without departing from the spirit of the invention.

Having thus described my invention, what I claim and desire to secure by Letters Patent is:—

1. A coupling comprising two shafts each having a plurality of radial arms, driving bolts arranged on said arms with the bolts of one shaft alternating with the bolts of the other shaft, flexible coupling disks arranged to transmit the drive from one set of bolts to the other, and a shield carried by one of the shafts and spaced from and extending over said disks and bolts to retain the bolts in substantially their normal relative positions upon failure of the coupling disks.

2. A coupling comprising two shafts each having a plurality of radial arms, driving bolts arranged on said arms with the bolts of one shaft alternating with the bolts of the other shaft, flexible coupling disks threaded on said bolts to transmit the drive from one shaft to the other, and a shield secured to the arms of one of said shafts and having a cylindrical part spaced from said disks and surrounding the bolts and arms and cut away opposite the ends of the bolts of the other shaft to give access to those bolts.

3. A coupling comprising shafts each having radial arms, bolts on said arms extending lengthwise of the shafts, the bolts of one shaft overlapping the bolts of the other shaft, coupling parts between the bolts of the respective shafts, and a shield mounted on the arms of one shaft spaced from said coupling parts and extending around said bolts and coupling parts.

4. A coupling comprising shafts each having coupling arms, flexible coupling parts secured to said arms to transmit power from one shaft to the other, and a shield secured to one shaft spaced from the flexible coupling parts and extending over the arms of the other shaft.

5. The combination with two shafts to be coupled, flexible coupling parts secured respectively to said shafts to transmit power from one shaft to the other, and means mounted on one shaft and spaced from said flexible coupling parts to prevent undue lateral separation of adjacent shaft ends in case of failure of said coupling parts.

6. A coupling comprising shafts each having radial arms, bolts on said arms extending lengthwise of the shafts, the bolts of one shaft overlapping the bolts of the other shaft, coupling parts carried by said bolts, means for securing said parts on said bolts, a shield carried by one shaft and extending around said bolts, and means independent of the first mentioned securing means for securing said shield to said shaft.

In testimony whereof I affix my signature.

HAROLD D. CHURCH.